E. Gray,
Bench Plane
No. 94,688. Patented Sep. 7, 1869.

Witnesses:
Wm. J. Niles
T. S. Genin

Inventor:
Edward Gray,
By his Attorneys
Upperman & Johnson

United States Patent Office.

EDWARD GRAY, OF OLDTOWN, MAINE.

Letters Patent No. 94,688, dated September 7, 1869.

IMPROVED IMPLEMENT FOR CARPENTERS' USE.

The Schedule referred to in these Letters Patent and making part of the same.

*To all whom it may concern:*

Be it known that I, EDWARD GRAY, of Oldtown, in the county of Penobscot, and State of Maine, have invented a new and useful Combined Adze and Plane; and I do hereby declare that the following is a full, clear, and exact description of the same, reference being had to the accompanying drawings, which make part of this specification, and in which—

Figure 3:
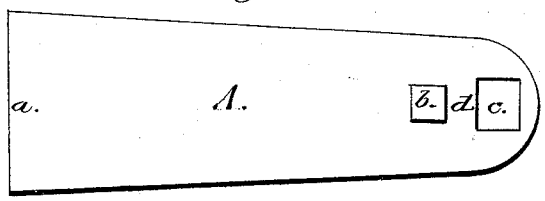

Figure 3, a view of the outer or face-side of the cutting-implement.

My improvements consist in the construction of a combined adze and plane as an implement for carpenters' use, having a double socket for the reception of handles to adapt the implement to use either as an adze or a plane.

In the accompanying drawings—

A represents the cutting-blade, of suitable length, width, and thickness, and bevelled at its cutting-end $a$ like a plane-iron, said cutting-portion being made of steel and welded thereon.

Figure 1:
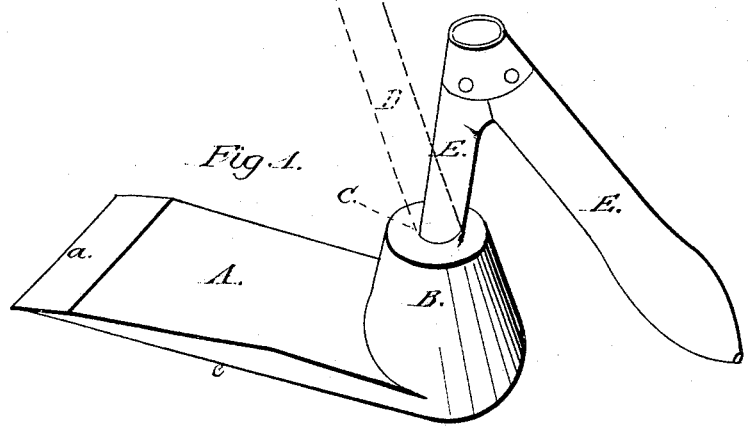
Figure 1 represents a view in perspective of the implement, when used as a plane.
Figure 2:
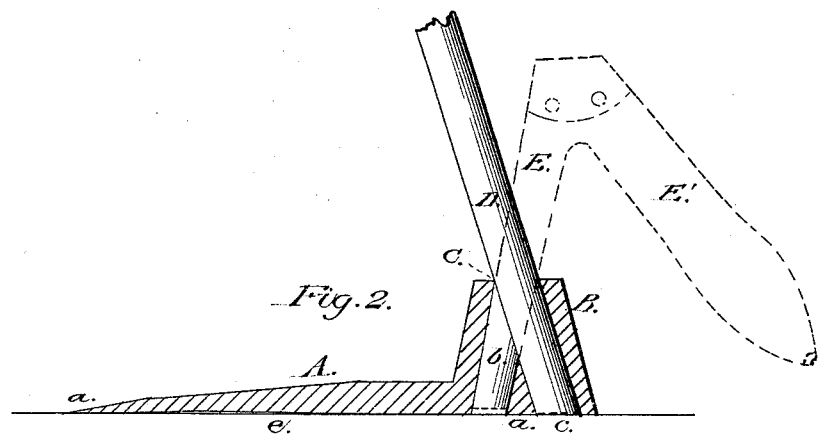
Figure 2 represents a vertical section of the same, when used as an adze.

The head B of this cutting-blade is made conical, and projects from the bevelled side thereof, and is sufficiently large at its base to have formed therein an opening, C, having two branches, $b$ $c$, extending in opposite directions to each other, so as to merge into one opening C, at the inner end of the head B, as shown in fig. 2, while they are separated by a division, $d$, at their opposite ends.

The opening $b$, inclining from the cutting-edge, is for the reception of the handle E, to adapt the implement to be used as a plane, and the other branch $c$ of the opening inclines in the opposite direction, and is for the reception of a handle, D, inclining toward the cutting-edge, to adapt the implement to be used as an adze, as shown in fig. 2.

The handle D, of course, must be of sufficient length to be grasped by both hands, in using the implement as an adze, and it is secured in its head-piece, or socket $c$, by having its end made square, so as to fit into a corresponding portion of the opening, and the handle D, thus shaped, may be inserted in its socket $c$ from the outer side of the cutting-blade, so as to be wedged therein in a direction inclining toward the cutting-edge $a$, so as to enable the user to split or chop therewith.

The handle E, used in adapting the implement to use as a plane, is secured in its socket $b$, so as to incline from the cutting-edge $a$, and is of such shape as that its outer branch, or portion E', shall be grasped by the right hand, while the conical head B of the cutting-blade forms a handle by which the user may grasp the implement with his left hand, whereby he is enabled to use the cutting-blade in a horizontal direction, by shoving it back and forth, like a plane, over the surface of the material to be dressed, the conical head serving as the body as well as the handle, by which the plane-blade is both held to the surface of the material, and moved over it.

When used in this position, of course the outer or flat side $e$ rests upon the material, and in order that its cutting-edge $a$ may bite into the material, so as to take off a shaving, or dress it, this side $e$ is made slightly concave, extending from the said cutting-edge to its head, as shown in fig. 2, so that the plane shall rest upon the material at its cutting-edge, and tend to dip slightly, to take hold of the surface of the material.

The handles are made removable, and, as represented in the drawings, they are made separate from each other, but it is obvious that one handle may be so constructed as to be used to adapt the implement to use as a plane and adze, by fitting it to the head in the proper manner, and it is also obvious that the handle or handles may be secured in their sockets in any suitable manner.

Instead of the handle of the plane having a rear branch to be grasped by the right hand, this branch may be turned toward the front, and grasped by the left hand, while the head of the blade may be made of such form as to be grasped by the right hand, and thus increase the pressure upon the front portion of the blade.

Having described my invention,

I claim—

1. The implement constructed as herein represented and described, and made capable of being used either as an adze or a plane.

2. The double-branched opening or socket C, formed in the head B of the cutting-blade A, for the reception of handles D E, inclining in opposite directions, to adapt the tool to use either as an adze or a plane, substantially as before described.

EDWARD X GRAY.
(his mark.)

Witnesses:
CHAS. A. TINKER,
WM. J. NILES.